US008001522B2

(12) United States Patent
Maniar et al.

(10) Patent No.: US 8,001,522 B2
(45) Date of Patent: Aug. 16, 2011

(54) CODE ACCELERATOR

(75) Inventors: Shrikant M Maniar, Mubai (IN); Uma Agadkar, Andhra Pradesh (IN); G. Jagadeesh Kumar Yadav, Andhra Pradesh (IN); Deepesh Kuruppath, Pune (IN)

(73) Assignee: Accenture Global Services Limited, Dublin (IE)

( * ) Notice: Subject to any disclaimer, the term of this patent is extended or adjusted under 35 U.S.C. 154(b) by 939 days.

(21) Appl. No.: 11/935,916

(22) Filed: Nov. 6, 2007

(65) Prior Publication Data
US 2009/0064097 A1 Mar. 5, 2009

(30) Foreign Application Priority Data

Aug. 29, 2007 (IN) .......................... 1656/MUM/2007

(51) Int. Cl.
*G06F 9/44* (2006.01)
(52) U.S. Cl. .......................... 717/106; 717/110; 717/114
(58) Field of Classification Search ........... 717/106–119
See application file for complete search history.

(56) References Cited

U.S. PATENT DOCUMENTS
7,559,066 B2 * 7/2009 Ho et al. ....................... 719/330

OTHER PUBLICATIONS

Scott Tilley, "2nd International Workshop on Web Site Evolution", 2000, Proceedings of WSE' 2000, 58 pages.*
Sneed, "Using XML to Integrate existing Software Systems into the Web", 2002, IEEE, pp. 167-172.*

* cited by examiner

*Primary Examiner* — Ted T Vo
(74) *Attorney, Agent, or Firm* — Fish & Richardson P.C.

(57) ABSTRACT

Methods and systems for generating mainframe computer code are provided. Collections of code segments for implementing common input and output operations and error handling operations are linked to an application development platform. Developers identify attributes of input and output operations. The application development platform may then search the collections to locate appropriate input and output operation and error handling operation code segments and generate a template that includes them. The developer may then add code to implement business logic and generate a mainframe application program.

21 Claims, 3 Drawing Sheets

CODE ACCELERATOR

FIELD OF THE INVENTION

This invention relates generally to the generation of computer code. More particularly, aspects of the invention provide methods and systems for automating the generation of computer code for portions of mainframe software applications.

DESCRIPTION OF RELATED ART

Mainframe computer applications are typically written in languages that are not object oriented, such as COBOL, CICS, DB2 and IMS languages. Because of the complexities involved in generating computer code in these languages, it is common for application developers to refer to manuals for syntax and examples during the coding process. This process can be tedious even when developing code to handle routine input and output operations and error handling operations.

Non-uniform coding practices also make it difficult to maintain mainframe computer applications. Mainframe computer applications are often difficult to read and understand. These problems are compounded when application developers do not use standard and best coding practices when writing computer code. Implementing a relatively minor modification to a mainframe application often involves expending a considerable amount of time to understand the process used when developing the original code.

Therefore, there is a need in the art for systems and methods that facilitate the generation of mainframe computer code and that use best coding practices.

BRIEF SUMMARY OF THE INVENTION

Aspects of the invention overcome problems and limitations of the prior art and allow developers to concentrate on developing code to implement business logic by providing systems and methods that generate mainframe computer code templates that include computer code for performing input and output operations and error handling operations. Application developers identify input and output operations. Collections of mainframe computer code for performing a variety of input and output and error handling operations may be stored in one or more databases. Each segment of mainframe computer code may include metadata that is used to describe the segment. An application development platform receives the identification of operations from a developer and searches the metadata associated with code segments to identify the best matches. The corresponding computer code segments may then be retrieved and used to create a mainframe computer code template. The developer may then apply any necessary business logic to the template to create an application program. The application development platform may also include copy books that contain mainframe computer code examples that may be expanded without requiring the developer to navigate from one screen to another.

Some embodiments of the invention may include or utilize computer-executable instructions for performing one or more of the disclosed methods. The computer-executable instructions may be stored on a computer-readable medium, such as a portable memory drive or optical disk.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
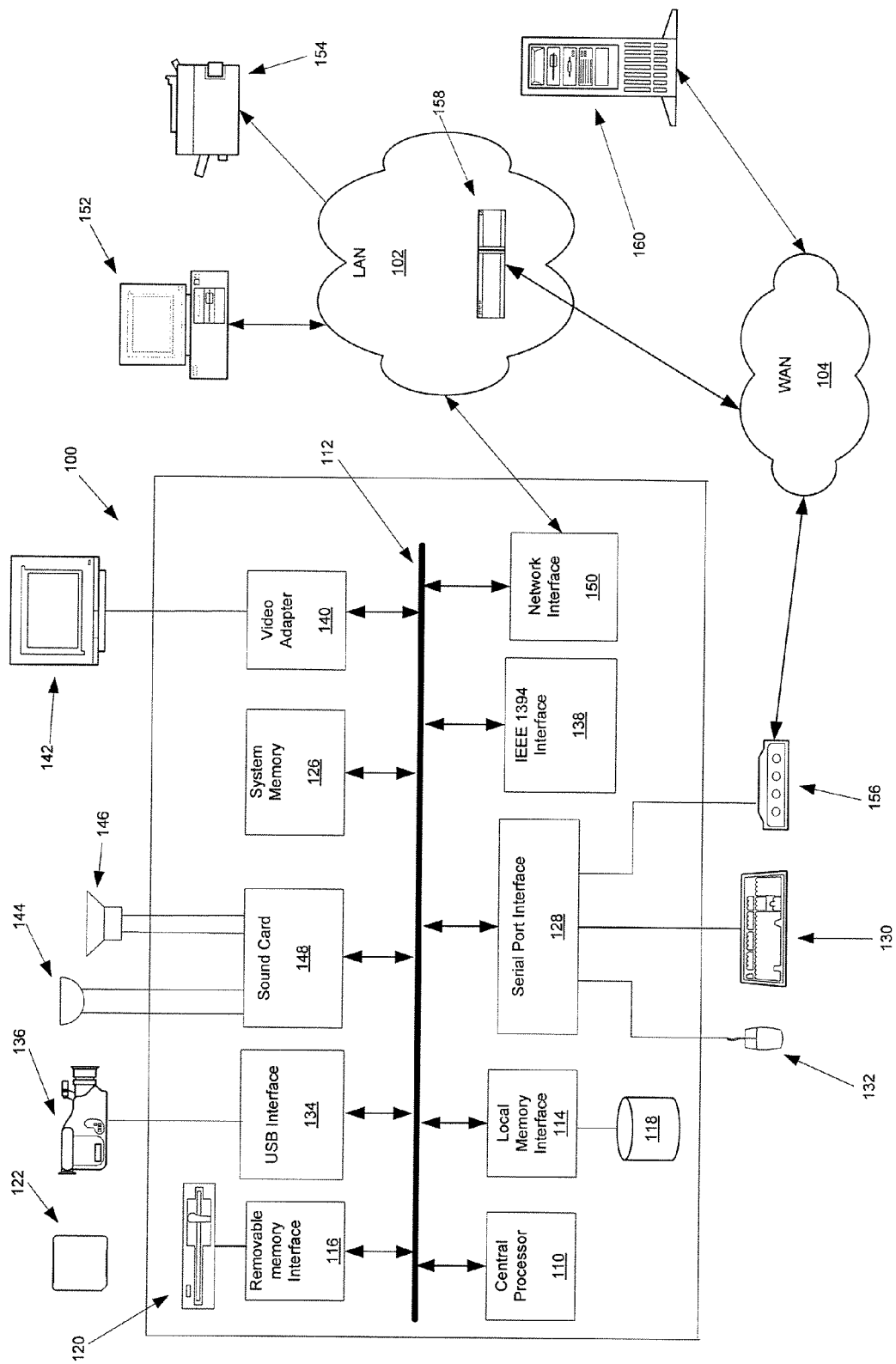
FIG. 1 shows a typical prior art workstation and communication connections.

Various embodiments of the present invention may be implemented with computer devices and systems that exchange and process data. Elements of an exemplary computer system are illustrated in FIG. 1, in which the computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hard-wired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may be configured to operate with particular manufacture interfaces such as FireWire developed by Apple Computer and i.Link developed by Sony. Peripheral devices may include touch sensitive screens, game pads scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

The operation of computer 100 and server 160 can be controlled by computer-executable instructions stored on a computer-readable medium 122. For example, computer 100 may include computer-executable instructions for transmitting information to server 160, receiving information from server 160 and displaying the received information on display device 142. Furthermore, server 160 may include computer-executable instructions for transmitting hypertext markup language (HTML) or extensible markup language (XML) code to computer 100.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102, 104, but also a "content network," which is comprised of the data-attributable to a single entity-which resides across all physical networks.

Figure 2:
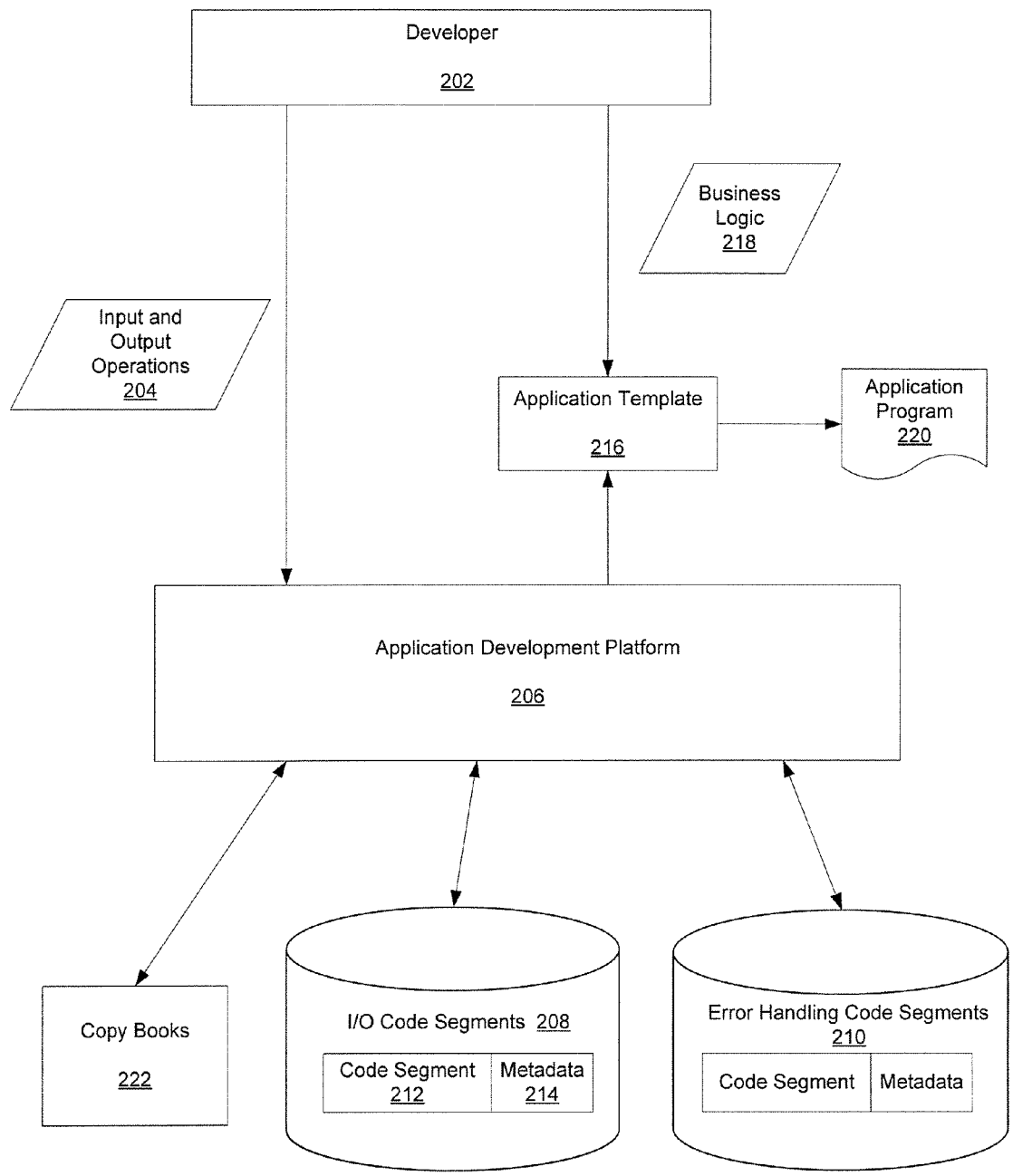
FIG. 2 illustrates a system that generates mainframe computer code, in accordance with an embodiment of the invention.

FIG. 2 illustrates a system that generates mainframe computer code, in accordance with an embodiment of the invention. A developer 202 provides the identification of input and output operations 204 to an application development platform 206. The input and output operations, for example, may relate to particular operations that will be performed on a database table and may be related to error handling operations. Error handling operations may identify a particular result that will occur when an identified error occurs. Operations 204 may be provided by developer 202 via a graphical user interface. The graphical user interface may include pan-els. The panels may include a variety of well known input elements including check boxes, dialog buttons and radio buttons.

As one skilled in the art will appreciate, application development platform 206 may be implemented with a mainframe based TSO ISPF environment or other hardware environment. Application development platform 206 is linked to a collection of input and output code segments 208 and a collection of error handling code segments 210. Collections 208 and 210 may be found in one more REXX tables or partioned data set members or files and made available within the application development platform 206. The code included in collections 208 and 210 may be code written in a language that is not object oriented, such as COBOL, CICS, DB2 or IMS code and may be uncompiled code.

Each code segment included within collections 208 and 210 may be associated with metadata that describes the functionality of the corresponding code segment. For example, if code segment 212 is a COBOL code segment designed to perform particular operations and a particular type of database table, metadata 214 may identify the operations and the type of table. The metadata may be used by application development platform 206 when selecting code segments that correspond to input and output operations and error handling operations 204 provided by developer 202. Links to, addresses or other mechanisms for locating corresponding code segments may be provided in metadata.

Application development platform 206 may use retrieved code segments to generate an application template 216. Application template 216 may include all of the input and output operation and error handling codes segments that will be needed by an application program. Developer 202 may add business logic 218 to application template 216 to generate application program 220.

Application development platform 206 may include or be linked to a variety of additional files, applications and collections to facilitate the generation of mainframe computer code. For example, application development platform 206 may be linked to copy books 222 that contain mainframe computer code examples. Copy books 222 may reduce the amount of time spend by developers reviewing manuals for syntax and examples. In one embodiment copy books 222 may be expanded within a graphical user interface without requiring the developer to navigate from one screen to another.

Figure 3:
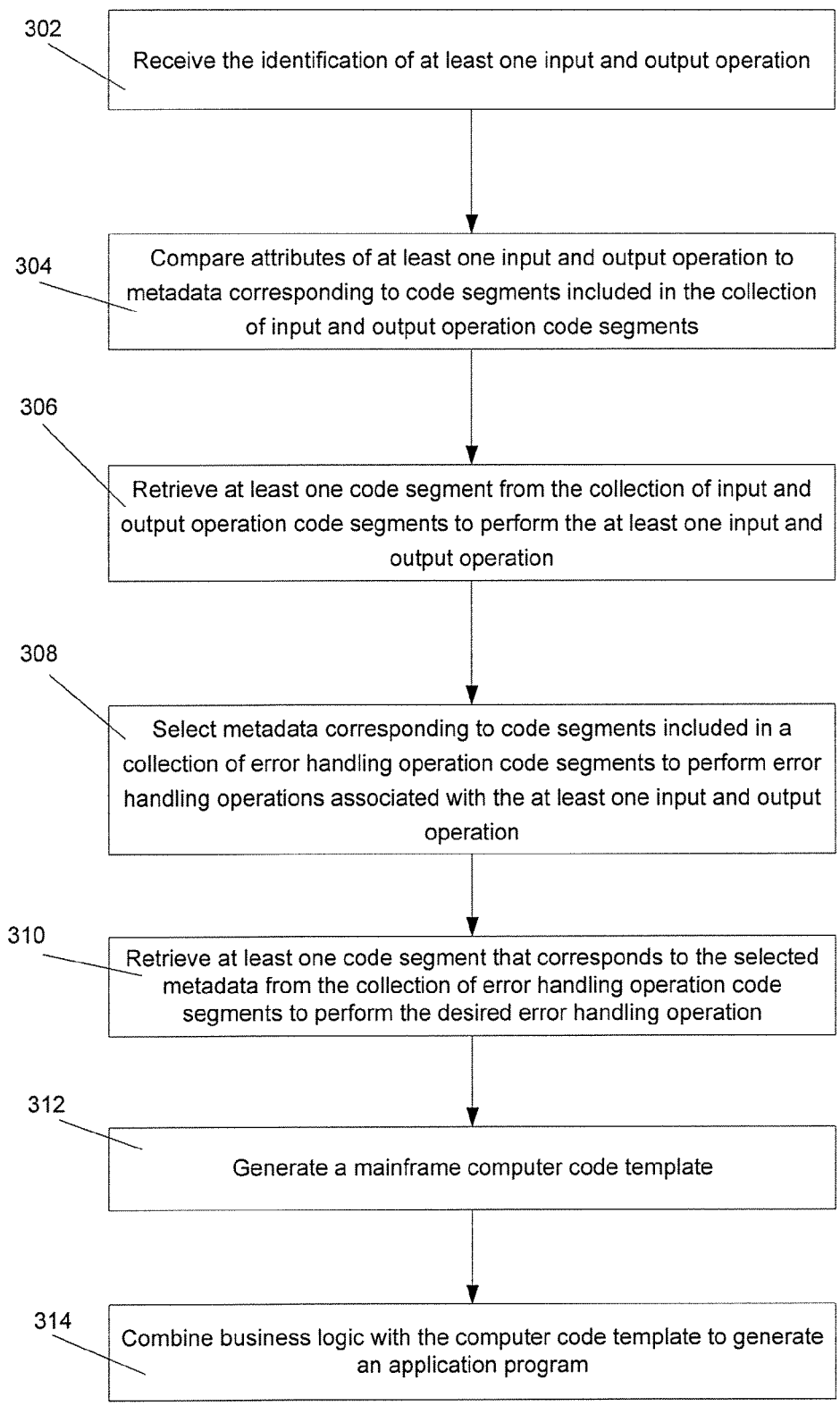
FIG. 3 illustrates a computer-implemented method of generating mainframe computer code, in accordance with an embodiment of the invention

FIG. 3 illustrates a computer-implemented method of generating mainframe computer code, in accordance with an embodiment of the invention. Those skilled in the art will appreciate that mainframe computers may support multiple users and execute multiple applications simultaneously. First, in step 302 the identification of at least one input and output operation is received. The identification may be received at an application development platform and may identify attributes of a desired operation. Next, in step 304 attributes of the at least one input and output operation are compared to metadata corresponding to code segments included in the collection of input and output operation code segments. In step 306 at least one code segment is retrieved from a collection of input and output operation code segments to perform the at least one input and output operation. Step 306 may include comparing attributes of an input and output operation to metadata corresponding to code segments included in the collection of input and output operation code segments and selecting a metadata that matches the attributes of the input and output operation.

Metadata corresponding to code segments included in a collection of error handling operation code segments is selected in step 308. The metadata is analyzed to identify code segments that will perform error handling operations associated with the at least one input and output operation. In step 310 at least one code segment that corresponds to the selected metadata is retrieved from the collection of error handling operation code segments to perform error handling operations associated with the at least one input and output operation.

After the input and output operation and error handling operation code segments are retrieved, a mainframe computer code template may be generated in step 312. The template may include uncompiled code that will perform the input and output operations and error handling operations provided by the developer. The developer may then provide code to implement business logic and the business logic may be combined with the computer code template in step 314 to generate an application program.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

We claim:

1. A computer-implemented method comprising:
receiving information input by a developer through a graphical user interface, the information identifying one or more attributes of a desired input and output operation to be performed on a database table;
comparing the attributes to metadata corresponding to one or more code segments included in a collection of input and output operation code segments, to identify one or more code segments for performing the desired input and output operation on the database table, the identified code segments including metadata that matches the attributes;
retrieving the identified code segments for performing the desired input and output operation on the database table;
analyzing metadata corresponding to one or more code segments from a collection of error handling operation code segments, to identify one or more code segments for performing an error handling operation associated with the desired input and output operation, the error handling operation identifying a particular result that will occur when an identified error occurs;
retrieving the identified code segments for performing the error handing operation associated with the desired input and output operation; and
automatically combining, by one or more computers, the retrieved code segments for performing the desired input and output operation on the database table with the retrieved code segments for performing the error handling operation associated with the desired input and output operation, to generate mainframe computer code.

2. The method of claim 1, comprising:
receiving additional information input by the developer through the graphical user interface, the additional information identifying business logic to be applied to the combination of the retrieved code segments; and
applying the business logic to the combination of the retrieved code segments.

3. The method of claim 1, wherein the collections are included in one or more REXX tables.

4. The method of claim 1, wherein the code segments are written in a language that is not object oriented.

5. The method of claim 4, wherein the language is COBOL, CICS, DB2 or IMS.

6. The method of claim 1, wherein, for each code segment, the metadata identifies a particular input and output operation and a type of database table.

7. The method of claim 1, wherein the code segments comprise uncompiled code.

8. A system comprising:
one or more computers; and
a computer-readable medium coupled to the one or more computers having instructions stored thereon which, when executed by the one or more computers, cause the one or more computers to perform operations comprising:
receiving information input by a developer through a graphical user interface, the information identifying one or more attributes of a desired input and output operation to be performed on a database table,
comparing the attributes to metadata corresponding to one or more code segments included in a collection of input and output operation code segments, to identify one or more code segments for performing the desired input and output operation on the database table, the identified code segments including metadata that matches the attributes,
retrieving the identified code segments for performing the desired input and output operation on the database table,
analyzing metadata corresponding to one or more code segments from a collection of error handling operation code segments, to identify one or more code segments for performing an error handling operation associated with the desired input and output operation, the error handling operation identifying a particular result that will occur when an identified error occurs,
retrieving the identified code segments for performing the error handing operation associated with the desired input and output operation, and
automatically combining the retrieved code segments for performing the desired input and output operation on the database table with the retrieved code segments for performing the error handling operation associated with the desired input and output operation, to generate mainframe computer code.

9. The system of claim 8, wherein the operations comprise:
receiving additional information input by the developer through the graphical user interface, the additional information identifying business logic to be applied to the combination of the retrieved code segments; and
applying the business logic to the combination of the retrieved code segments.

10. The system of claim 8, wherein the collections are included in one or more REXX tables.

11. The system of claim 8, wherein the code segments are written in a language that is not object oriented.

12. The system of claim 11, wherein the language is COBOL, CICS, DB2 or IMS.

13. The system of claim 8, wherein, for each code segment, the metadata identifies a particular input and output operation and a type of database table.

14. The system of claim 8, wherein the code segments comprise uncompiled code.

15. A computer storage medium encoded with a computer program, the program comprising instructions that when executed by one or more computers cause the one or more computers to perform operations comprising:

receiving information input by a developer through a graphical user interface, the information identifying one or more attributes of a desired input and output operation to be performed on a database table;

comparing the attributes to metadata corresponding to one or more code segments included in a collection of input and output operation code segments, to identify one or more code segments for performing the desired input and output operation on the database table, the identified code segments including metadata that matches the attributes;

retrieving the identified code segments for performing the desired input and output operation on the database table;

analyzing metadata corresponding to one or more code segments from a collection of error handling operation code segments, to identify one or more code segments for performing an error handling operation associated with the desired input and output operation, the error handling operation identifying a particular result that will occur when an identified error occurs;

retrieving the identified code segments for performing the error handing operation associated with the desired input and output operation; and automatically combining the retrieved code segments for performing the desired input and output operation on the database table with the retrieved code segments for performing the error handling operation associated with the desired input and output operation, to generate mainframe computer code.

16. The medium of claim 15, wherein the operations comprise:

receiving additional information input by the developer through the graphical user interface, the additional information identifying business logic to be applied to the combination of the retrieved code segments; and applying the business logic to the combination of the retrieved code segments.

17. The medium of claim 15, wherein the collections are included in one or more REXX tables.

18. The medium of claim 15, wherein the code segments are written in a language that is not object oriented.

19. The medium of claim 18, wherein the language is COBOL, CICS, DB2 or IMS.

20. The medium of claim 15, wherein, for each code segment, the metadata identifies a particular input and output operation and a type of database table.

21. The medium of claim 15, wherein the code segments comprise uncompiled code.

* * * * *

UNITED STATES PATENT AND TRADEMARK OFFICE
CERTIFICATE OF CORRECTION

| | | |
|---|---|---|
| PATENT NO. | : 8,001,522 B2 | Page 1 of 1 |
| APPLICATION NO. | : 11/935916 | |
| DATED | : August 16, 2011 | |
| INVENTOR(S) | : Shrikant Maniar | |

It is certified that error appears in the above-identified patent and that said Letters Patent is hereby corrected as shown below:

Title page, Item (75), Inventors: delete "Mubai" and replace with --Mumbai--;

Column 5, line 48, delete "handing" and replace with --handling--;

Column 6, line 38, delete "handing" and replace with --handling--;

Column 7, line 22, delete "handing" and replace with --handling--.

Signed and Sealed this
Twenty-fifth Day of October, 2011

David J. Kappos
*Director of the United States Patent and Trademark Office*